(12) United States Patent
Daly et al.

(10) Patent No.: US 8,562,755 B1
(45) Date of Patent: Oct. 22, 2013

(54) ANTI-TIN WHISKER SOLDER

(75) Inventors: Gregory T. Daly, Glendora, NJ (US); Gary H. Yan, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 347 days.

(21) Appl. No.: 12/365,579

(22) Filed: Feb. 4, 2009

Related U.S. Application Data

(60) Provisional application No. 61/026,698, filed on Feb. 6, 2008.

(51) Int. Cl.
*B23K 35/34* (2006.01)

(52) U.S. Cl.
USPC .............................. 148/23; 148/400

(58) Field of Classification Search
USPC ..................... 524/268; 148/23, 400
See application file for complete search history.

(56) References Cited

U.S. PATENT DOCUMENTS

| 7,572,343 B2 * | 8/2009 | Lee et al. ................... 148/23 |
| 2004/0054047 A1 * | 3/2004 | Lai et al. ................... 524/268 |

FOREIGN PATENT DOCUMENTS

| WO | 2005/016580 | 2/2005 |

OTHER PUBLICATIONS

NASA Goddard Space Flight Center Photo of the Month; http://nepp.nasa.gov/whisker/photos/pom/.
NASA Photo Gallery; http://nepp.nasa.gov/whisker/photos/index.html.
McCorvey; "Tin Whiskers Found on ATVC S/N 0034;" http://nepp.gov/whisker/reference/tech_papers/2006-Leidecker-Tin-Whisker-Failures.pdf (Mar. 8, 2006).
NASA Goddard Space Flight Center; http://nepp.nasa.gov/whisker/photos/pom/2004april.htm, Apr. 2004.
Dr. Bob Esser; "Risk Assessment of Sn Plated Solder Lug;" DfR Solutions.
Dr. Henning Leidecker et al; "Tin Whiskers: A History of Documented Electrical System Failures—A Briefing Prepared for the Space Shuttle Program Office;" (Apr. 2006).
Hybrid Plastics—POSS Shielde® (updated Oct. 2006).
Hybrid Plastics—POSS® Short-Stop (updated Jul. 2008).
Andre Lee et al; "Nanostructured Chemicals Posse ® in Pb-free Electronic Solders," presentation given at the 2007 Advanced Materials Symposium (2007).

* cited by examiner

*Primary Examiner* — Weiping Zhu
(74) *Attorney, Agent, or Firm* — Howard IP Law Group, PC

(57) ABSTRACT

A lead-free solder composition including about 90% to about 99% by weight of a lead-free tin solder based on the total weight of the lead-free solder composition and about 1% to about 10% by weight of a polyhedral oligomeric silsesquioxane based on the total weight of the lead-free solder composition.

5 Claims, 2 Drawing Sheets

ANTI-TIN WHISKER SOLDER

RELATED APPLICATION

The application claims the benefit of U.S. Provisional Application No. 61/026,698, filed Feb. 6, 2008, the entire disclosure of which is incorporated herein by reference.

FIELD OF THE INVENTION

This invention relates to lead-free solder compositions. More particularly, this invention relates lead-free tin solder compositions and related methods.

BACKGROUND OF THE INVENTION

Tin-lead has been a worldwide solder staple for many decades due to its advantageous low melting range forming a stable joint with no damage to heat-sensitive parts. Recent legislation by the European Union has required the removal of lead from manufactured products via the Directive entitled: "Restriction of Hazardous Substances (RoHS)."

A preferred alternative solder would be a lead-free tin solder. This poses manufacturing problems due to a phenomenon known as tin whiskers. Tin whiskers are individual crystals of tin that, for example, grow spontaneously from a tin coated surface of a part, as shown in FIG. 1A (see: Slide 4 of "Tin Whiskers: A History of Documented Electrical System Failures" by Dr. Henning Leidecker and Jay Brusse, http://nepp.nasa.gov/whisker/reference/tech_papers/2006-Leidecker-Tin-Whisker-Failures.pdf) and in FIG. 1B (see: http://nepp.nasa.gov/whisker/photos/pom/2004april.htm). These tin whiskers can cause deleterious problems in electronic assemblies, such as electrical shorts and, if broken loose, mechanical damage.

Accordingly, there is a need for a lead-free tin solder that prevents the growth of tin whiskers, thereby eliminating the aforementioned problems.

SUMMARY

Disclosed herein is a lead-free solder composition comprising about 90% to about 99% by weight of a lead-free tin solder based on the total weight of the lead-free solder composition and about 1% to about 10% by weight of a polyhedral oligomeric silsesquioxane based on the total weight of the lead-free solder composition.

Further disclosed herein is a method for preventing tin whiskers in a lead-free solder. The method comprises providing a first amount of lead-free tin solder; and mixing a second amount of polyhedral oligomeric silsesquioxane with the first amount of lead-free tin solder. The first and second amounts are selected to provide a resulting composition containing about 90% to about 99% by weight of the lead-free tin solder based on the total weight of the resulting composition and about 1% to about 10% by weight of the polyhedral oligomeric silsesquioxane based on the total weight of the resulting composition.

DETAILED DESCRIPTION

Figure 1A:
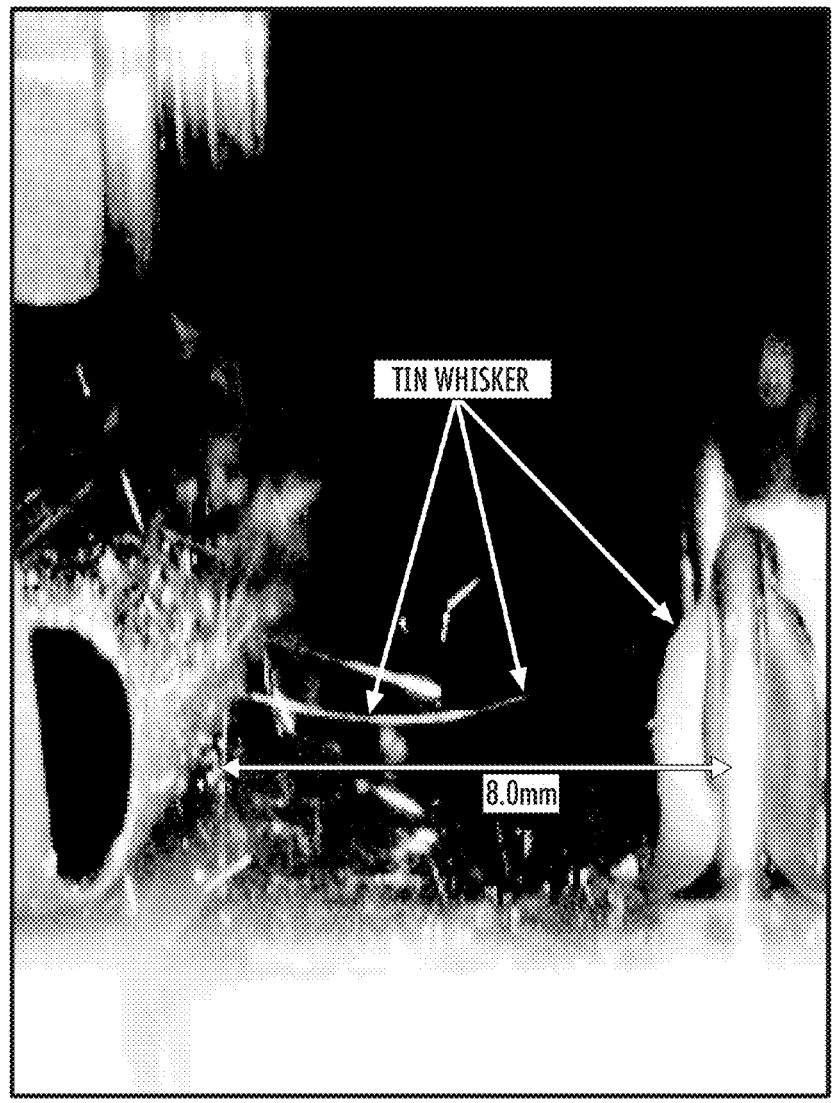
FIGS. 1A and 1B are pictures of parts which have been plated using a conventional tin-plate composition.
Figure 1B:
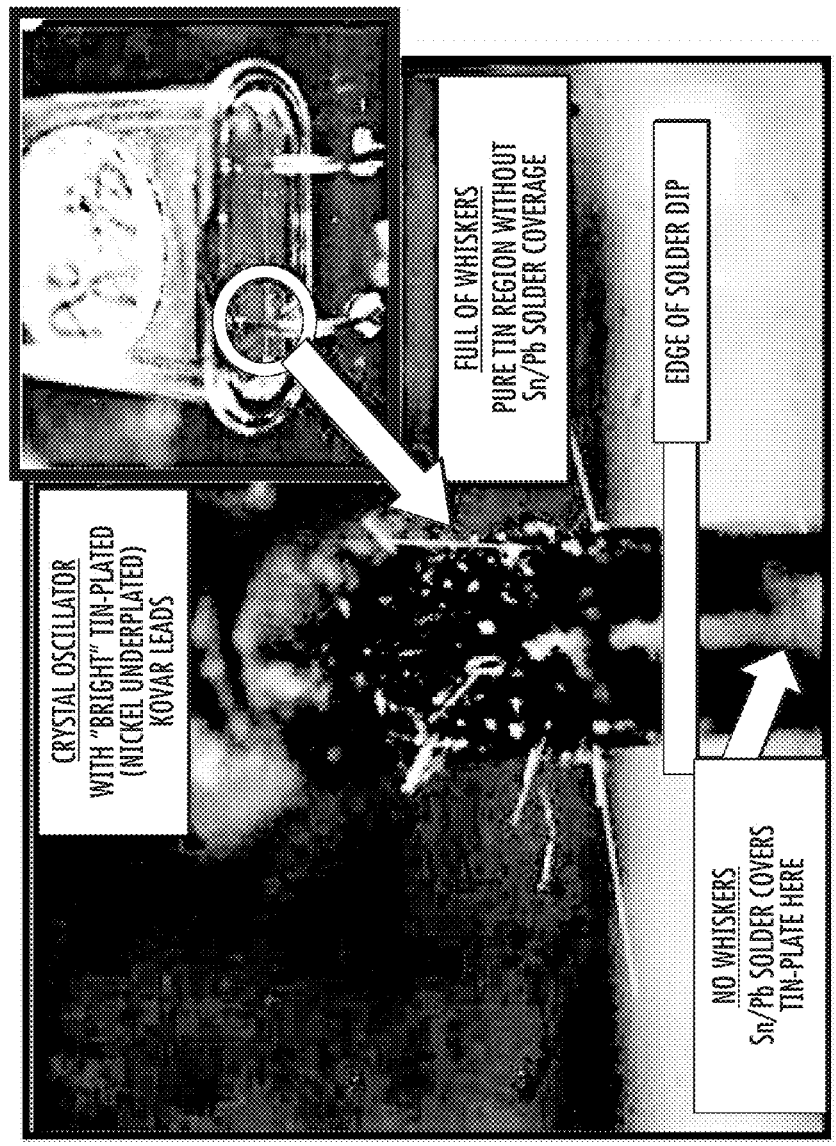

A lead-free solder composition, in one embodiment, comprises a mixture including a lead-free or substantially lead-free tin solder (collectively referred to hereinafter as lead-free tin solder) and at least one polyhedral oligomeric silsesquioxane (POSS). POSS is a nano-structured material that comprises a cage-like inorganic core made with a silicon and oxygen framework. Including the POSS within the solder composition makes it possible to leverage the nanocomposite properties of the POSS in order to deter and/or reduce electromigration effects, which are believed to induce tin whisker growth through high current density stresses. Both electromigration and compressive stresses are generally viewed to be leading cause of tin whiskers in lead-free tin solder. The solder may be provided in any desired form including, without limitation, a paste, a wire, and a bar.

The lead-free tin solder in the composition may comprise a tin-silver alloy solder. The tin-silver alloy provides high joint strength as compared with tin-lead solder, and is intended for replacing tin-lead solder. In one embodiment of the tin-silver alloy solder, the tin comprises a weight percent concentration in the alloy of 96.5% and the silver comprises a weight percent concentration of 3.5% in the alloy.

The lead-free tin solder in the composition may also comprise a tin-silver-copper alloy solder. The copper in the composition lowers the melting point of the composition, improves wettability of the molten solder, and improves the thermal cycle fatigue resistance of the resulting solder joint. In one embodiment of the tin-silver-copper alloy, the tin comprises a weight percent concentration in the alloy of 95.5%, the silver comprises a weight percent concentration of 3.8% in the alloy and the copper comprises a weight percent concentration of 0.7% in the alloy. In another embodiment of the tin-silver-copper alloy, the tin comprises a weight percent concentration in the alloy of 95.5%, the silver comprises a weight percent concentration of 3.9% in the alloy and the copper comprises a weight percent concentration of 0.6% in the alloy. In a further embodiment of the tin-silver-copper alloy, the tin comprises a weight percent concentration in the alloy of 95.5%, the silver comprises a weight percent concentration of 4.0% in the alloy and the copper comprises a weight percent concentration of 0.5% in the alloy. In still a further embodiment of the tin-silver-copper alloy, the tin comprises a weight percent concentration of 96.5% in the alloy, the silver comprises a weight percent concentration of 3.0% in the alloy, and the copper comprises a weight percent concentration of 0.5% in the alloy.

The amount of POSS in the composition typically comprises about 1% to about 10% by weight within the lead-free solder matrix. In one preferred embodiment, the amount of POSS in the composition comprises 3% to 5% by weight within the lead-free solder matrix.

The type of POSS in the composition may comprise without limitation, TH1550 Mercaptopropylisobutyl POSS, SO1458 Trisilanolphenyl POSS, AMO273 Aminopropylphenyl POSS, TH1555 Mercaptopropylisooctyl POSS, SO1440 Disilanolisobutyl POSS, SO1455 Trisilanolisooctyl POSS, SO1460 Tetrasilanolphenyl POSS, SH1310 Octasilane POSS, SO1450 Trisilanolisobutyl POSS, and any combination thereof. In a preferred embodiment, the POSS in the composition may comprise TH1550 Mercaptopropylisobutyl POSS, SO1458 Trisilanolphenyl POSS, AMO273 Aminopropylphenyl POSS, and any combination thereof.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A lead-free solder composition comprising:
   about 90% to about 99% by weight of a lead-free tin solder based on the total weight of the lead-free solder composition, the lead-free tin solder comprising about 0.5% to about 0.7% by weight of copper, about 3.0% to about 4.0% by weight of silver, and a balance of tin; and
   about 1% to about 10% by weight of polyhedral oligomeric silsesquioxane based on the total weight of the lead-free solder composition,
   wherein the polyhedral oligomeric silsesquioxane contains at least one mercaptopropyl group.

2. The lead-free solder composition of claim 1, wherein the polyhedral oligomeric silsesquioxane comprises at least one of mercaptopropylisobutyl and mercaptopropylisooctyl.

3. A lead-free solder composition comprising:
   about 90% to about 99% by weight of a lead-free tin solder based on the total weight of the lead-free solder composition; and
   about 1% to about 10% by weight of polyhedral oligomeric silsesquioxane based on the total weight of the lead-free solder composition,
   wherein the polyhedral oligomeric silsesquioxane contains at least one mercaptopropyl group.

4. The lead-free solder composition of claim 3, wherein the lead-free tin solder comprises a tin-silver alloy solder.

5. The lead-free solder composition of claim 4, wherein the lead-free tin solder comprises about 3.5% by weight of silver and a balance of tin.

* * * * *